(12) United States Patent
Farinha et al.

(10) Patent No.: US 11,397,288 B2
(45) Date of Patent: Jul. 26, 2022

(54) CERAMIC REFLECTOR FOR INFRARED LAMPS

(71) Applicant: SOLARONICS S.A., Armentieres (FR)

(72) Inventors: James Farinha, Strazeele (FR); Nicolas Even, Laventie (FR); Philippe Arnouts, Bailleul (FR)

(73) Assignee: SOLARONICS S.A., Armentleres (FR)

(*) Notice: Subject to any disclaimer, the term of this patent is extended or adjusted under 35 U.S.C. 154(b) by 616 days.

(21) Appl. No.: 16/476,394

(22) PCT Filed: Jan. 9, 2018

(86) PCT No.: PCT/EP2018/050393
§ 371 (c)(1),
(2) Date: Jul. 8, 2019

(87) PCT Pub. No.: WO2018/137917
PCT Pub. Date: Aug. 2, 2018

(65) Prior Publication Data
US 2020/0049867 A1    Feb. 13, 2020

(30) Foreign Application Priority Data
Jan. 24, 2017   (EP) ................................. 17290007

(51) Int. Cl.
*G02B 5/09* (2006.01)
*H05B 3/00* (2006.01)

(52) U.S. Cl.
CPC .............. *G02B 5/09* (2013.01); *H05B 3/0038* (2013.01); *H05B 2203/032* (2013.01)

(58) Field of Classification Search
None
See application file for complete search history.

(56) References Cited

U.S. PATENT DOCUMENTS 1,479,819 A * 1/1924 Klueverannej ..... B41F 23/0406
                                                      219/509
3,114,822 A * 12/1963 Boland ................. A47L 11/085
                                                      373/128
(Continued)

FOREIGN PATENT DOCUMENTS

EP       2480390 B1    12/2013
WO    2013044916 A1     4/2013

OTHER PUBLICATIONS

International Search Report and Written Opinion dated Apr. 3, 2018 for PCT/EP2018/050393, 10 pages.

*Primary Examiner* — Thor S Campbell
(74) *Attorney, Agent, or Firm* — Rothwell, Figg, Ernst & Manbeck, P.C.

(57) ABSTRACT

A ceramic reflector (100) for at least one IR lamp comprises at least one elongated concave reflector body (102). Each of the at least one elongated concave reflector bodies comprises an elongated bottom section and two elongated upstanding walls. Each of the elongated concave reflector bodies is provided for containing at least one IR lamp (150) and for reflecting the IR light from the at least one IR lamp. Each elongated concave reflector body has in each cross section at both of its upstanding walls a wall height. The wall height is the vertical distance between the deepest level of the bottom section of the reflector body and the highest level of the upstanding wall. At one or at both longitudinal ends of at least one reflector body; the wall height is at both upstanding walls larger than in the middle section of the elongated concave reflector body.

12 Claims, 2 Drawing Sheets

(56) References Cited

U.S. PATENT DOCUMENTS

| | | | | |
|---|---|---|---|---|
| 3,763,349 A | * | 10/1973 | Desloge | F24C 7/043 |
| | | | | 392/432 |
| 3,836,751 A | * | 9/1974 | Anderson | H05B 3/0047 |
| | | | | 392/416 |
| 3,862,397 A | * | 1/1975 | Anderson | C30B 25/10 |
| | | | | 118/724 |
| 4,450,343 A | * | 5/1984 | Dundon | H05B 3/26 |
| | | | | 219/536 |
| 4,533,820 A | * | 8/1985 | Shimizu | C30B 25/105 |
| | | | | 219/390 |
| 4,678,959 A | * | 7/1987 | Mewissen | H01J 61/523 |
| | | | | 313/623 |
| 4,685,762 A | * | 8/1987 | Bjornberg | F24C 7/065 |
| | | | | 359/350 |
| 4,975,561 A | * | 12/1990 | Robinson | C23C 16/481 |
| | | | | 219/390 |
| 5,790,752 A | * | 8/1998 | Anglin | F24H 1/102 |
| | | | | 392/419 |
| 6,242,717 B1 | | 6/2001 | Sanderson | |
| 6,361,301 B1 | * | 3/2002 | Scaglotti | B29C 49/68 |
| | | | | 425/526 |
| 6,393,211 B1 | | 5/2002 | Jolan et al. | |
| 2009/0279879 A1 | * | 11/2009 | Zenteno | H05B 3/008 |
| | | | | 392/416 |
| 2011/0013892 A1 | * | 1/2011 | Ragay | H05B 3/0076 |
| | | | | 392/422 |
| 2012/0267357 A1 | * | 10/2012 | Monteix | B29C 49/06 |
| | | | | 219/411 |
| 2015/0266123 A1 | | 9/2015 | Lai et al. | |

\* cited by examiner

CERAMIC REFLECTOR FOR INFRARED LAMPS

CROSS REFERENCE TO RELATED APPLICATION(S)

This application is a 35 U.S.C. § 371 National Stage of International Patent Application No. PCT/EP2018/050393 filed Jan. 9, 2018, designating the United States which claims priority to and the benefit of European Patent Application No. 17290007.8 filed Jan. 24, 2017, the entire contents of which are incorporated herein by reference.

TECHNICAL FIELD

The invention relates to the field of ceramic reflectors for IR (infrared) lamps. The invention relates further to electrical IR emitters that can e.g. be used in industrial heat treatment processes, e.g. in drying coatings on continuous web products, e.g. coatings on paper.

BACKGROUND ART

WO2008/002904 discloses an IR lamp heating module for multi-zone thermal processing furnaces. The module comprises an insulating reflector body—e.g. out of ceramic material—having spaced grooves; and at least one IR lamp disposed in each groove and spaced from the wall of the groove to provide an annular space for the passage of cooling air between the lamp and the groove wall. The module further comprises an IR transmissive plate disposed in contact with the grooved face of the reflector body to effectively isolate each lamp from lamps in adjacent grooves and to isolate the lamps from a process zone of the furnace. The groove forms a highly reflective surface configured to effectively direct IR light from the lamp through the IR transmissive plate into the process zone. The connectors of the IR lamps are connected outside the length of the reflector body.

US2008/315744A discloses a lamp assembly comprising a lamp having a lamp vessel with a longitudinal axis. The lamp assembly comprises a support member comprising a bottom surface extending substantially along the longitudinal axis. Between the bottom surface and the lamp vessel, a concave reflective member is supported by the support member and has a surface comprising a material with a melting temperature higher than 600 degrees centigrade, e.g. a ceramic material. In a preferred embodiment, the lamp assembly comprises a support member comprising at least one closing surface substantially perpendicular to the longitudinal axis. The closing surface has a slot in which an end of the lamp is inserted.

EP2480390A1 discloses an installation adapted for the heat treatment of objects. The installation comprises a reflective device comprising a plurality of elongated and opened IR-reflective cavities stacked one onto the other according to a stacking axis and arranged to lodge elongated IR lamps. The aperture of each cavity faces generally a main axis parallel to the stacking axis along which the object would be placed. The reflective device comprises protrusions separating the cavities one to the other and extending generally transversal/transverse to the stacking axis. The reflective device is made as at least one integral block of a heat-conductive material. The cavities may each comprise a curved bottom portion and two opposite side surfaces provided with respective longitudinal breaks of slope at a junction with the curved bottom.

DISCLOSURE OF INVENTION

The first aspect of the invention is a ceramic reflector for at least one IR lamp. The reflector comprises at least one elongated concave reflector body. Each of the at least one elongated concave reflector bodies comprises an elongated bottom section and two elongated upstanding walls. Each of the elongated concave reflector bodies is provided for containing at least one IR lamp—and possibly for containing e.g. 2, 3 or 4 juxtaposed IR lamps—and for reflecting the IR light from the at least one IR lamp. Each elongated concave reflector body has in each cross section at both of its upstanding walls a wall height, wherein the wall height is the vertical distance between the deepest level of the bottom section of the reflector body and the highest level of the upstanding wall. At at least one longitudinal end—and preferably at both longitudinal ends—of at least one reflector body; the wall height is at both upstanding walls larger than in the middle section of the elongated concave reflector body.

The ceramic reflector of the invention has the benefit that connectors of the lamps provided in the concave reflector bodies can be provided at or outside the longitudinal end or longitudinal ends of the reflector body where the wall height is larger than in the middle section of the concave reflector body. This way, the connectors of the lamps are effectively shielded from IR radiation from IR lamps provided in the neighbourhood. Such IR radiation would create an excessive temperature increase of the connectors of the lamps, with early failure of the IR lamps as a consequence. As a result, the IR lamps mounted in infrared emitters having ceramic reflectors according to the invention have an increased lifetime; and less air flow is required to cool the connectors.

Preferably the ceramic reflector is made out of silica, e.g. out of electrofused silica.

Preferably, the ceramic reflector is made out of alumina.

Preferably, the ceramic reflector is multi-layered, wherein the ceramic reflector comprises a reflective surface layer out of a first material; e.g. silica or alumina; covering a second ceramic material. It is possible to provide transition layers between the reflective surface layer and the second ceramic material.

The upstanding wall is preferably as thick as is technically feasible and furthermore selected such that an IR-lamp can be fitted in the ceramic reflector.

A preferred ceramic reflector comprises a plurality of juxtaposed elongated concave reflector bodies. Each of the at least one elongated concave reflector bodies comprises an elongated bottom section and two elongated upstanding walls. Each of the elongated concave reflector bodies is provided for containing at least one IR lamp—and possibly is provided for containing e.g. 2, 3 or 4 juxtaposed IR lamps—and for reflecting the IR light from the at least one IR lamp. Each elongated concave reflector body has in each cross section at both of its upstanding walls a wall height. The wall height is the vertical distance between the deepest level of the bottom section of the reflector body and the highest level of the upstanding wall. At at least one longitudinal end—and preferably at both longitudinal ends—of each reflector body; the wall height is at both upstanding walls larger than in the middle section of the elongated concave reflector body.

Preferably, the at least one elongated concave reflector body comprises at its deepest level a number of through holes, provided for the flow of cooling air. It is the benefit of such embodiments that the back of the ceramic reflector, which is the side opposite to the side where the IR lamps are provided, can be put in overpressure such that cooling air flows through the through holes in order to cool the IR lamps.

Preferably, at at least one longitudinal end—and preferably at both longitudinal ends—of at least one reflector body; the wall height is at both upstanding walls over at least a length of 6 mm larger than in the middle section of the elongated concave reflector body. More preferably, the wall height is at both upstanding walls over at least a length of 8 mm larger than in the middle section of the elongated concave reflector body. Even more preferred, the wall height is at both upstanding walls over at least a length of 10 mm larger than in the middle section of the elongated concave reflector body.

Preferably, at at least one longitudinal end—and preferably at both longitudinal ends—of at least one reflector body; the wall height is at both upstanding walls at least 7 mm; and preferably at least 10 mm, larger than in the middle section of the elongated concave reflector body.

In preferred ceramic reflectors, neighbouring elongated concave reflector bodies have a common elongated upstanding wall.

Preferably, the bottom of the ceramic reflector is flat, wherein with bottom of the reflector is meant the opposite side of the reflector from the side where the IR lamp or IR lamps can be provided.

Preferably, the ceramic reflector is one single sintered or fused ceramic part.

Preferably the ceramic reflector is made out of silica, e.g. out of electrofused silica.

Preferably, the ceramic reflector is made out of alumina.

Preferably, the ceramic reflector is multi-layered, wherein the ceramic reflector comprises a reflective surface layer out of a first material; e.g. silica or alumina; covering a second ceramic material. It is possible to provide transition layers between the reflective surface layer and the second ceramic material.

A second aspect of the invention is an electrical IR emitter comprising a ceramic reflector as in any embodiment of the first aspect of the invention; and one or more than one IR lamp. The IR-lamp or IR-lamps is or are provided in the elongated concave reflector bodies. The electrical connectors of the IR lamps are provided at or outside the longitudinal ends of the reflector bodies where the wall height is at both upstanding walls larger than in the middle section of the reflector bodies.

Preferably, the highest level of the IR-lamp is located below the wall height of the longitudinal ends of the reflector bodies where the wall height is at both upstanding walls larger than in the middle section of the reflector bodies. With the highest level of the IR-lamp is meant the level of the IR-lamp where the vertical distance from the deepest level of the bottom section of the reflector body is the highest.

Preferably, the highest level of the IR-lamp is located more distant from the deepest level of the bottom section of the reflector body than the height of the upstanding walls in the middle section of the reflector bodies. With the highest level of the IR-lamp is meant the level of the IR-lamp where the vertical distance from the deepest level of the bottom section of the reflector body is the highest.

Preferably, the electrical IR emitter comprises a base structure and a plurality of ceramic supports. The ceramic reflector and the plurality of ceramic supports are fixed onto the base structure without direct contact between the ceramic reflector and the ceramic supports. The electrical connectors of the IR lamps are electrically connected to electrical connectors in the ceramic supports. The ceramic reflector and the plurality of ceramic supports can e.g. be fixed onto the base structure by means of screw fixations.

BRIEF DESCRIPTION OF FIGURES IN THE DRAWINGS

MODE(S) FOR CARRYING OUT THE INVENTION

Figure 1:
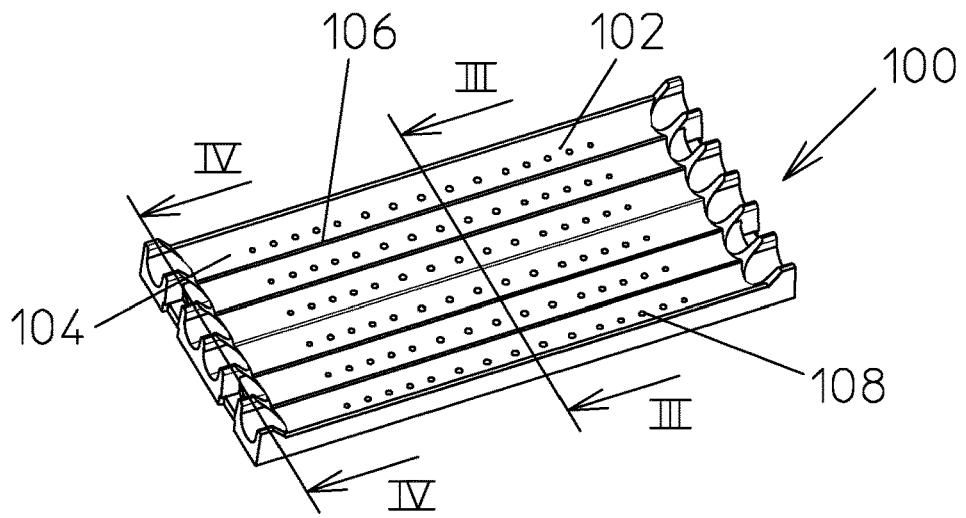
FIGS. 1 and 2 show a ceramic reflector according to the invention.
Figure 2:
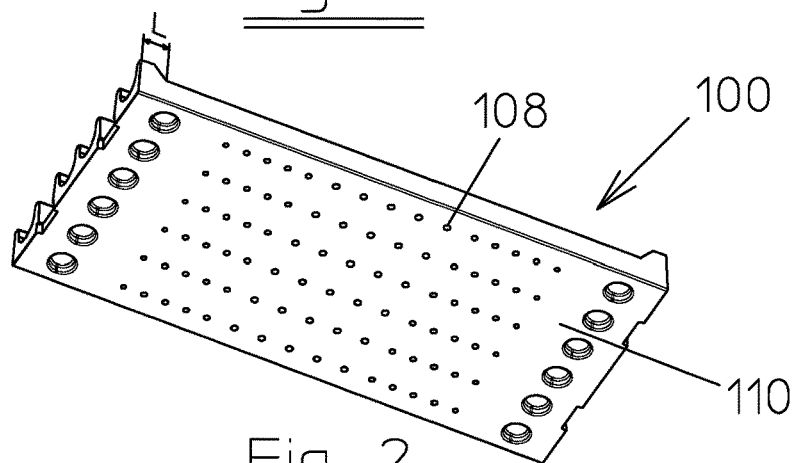
Figure 3:
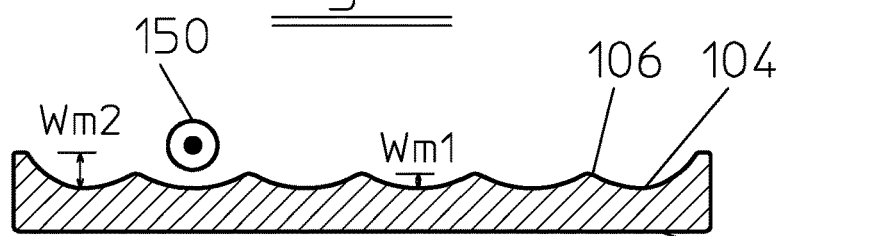
FIGS. 3 and 4 show cross sections of the ceramic reflector of FIGS. 1 and 2.
Figure 4:
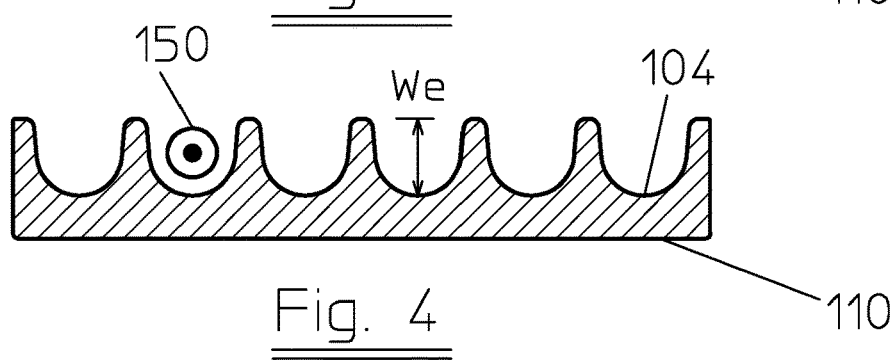

FIGS. 1 and 2 show a ceramic reflector according to the invention. FIG. 3 shows a cross section of the ceramic reflector of FIGS. 1 and 2 along plane III-III. FIG. 4 shows a cross section of the ceramic reflector of FIGS. 1 and 2 along plane IV-IV. The ceramic reflector 100 comprises a plurality of juxtaposed elongated concave reflector bodies 102. Each of the at least one elongated concave reflector bodies comprises an elongated bottom section 104 and two elongated upstanding walls 106. Neighbouring elongated concave reflector bodies have a common elongated upstanding wall.

The reflector bodies 102 comprise at their deepest level a number of through holes 108 provided for the flow of cooling air. This way, the back of the ceramic reflector can be put in overpressure such that cooling air flows through the through holes 108 in order to cool the IR lamps. The bottom 110 of the exemplary ceramic reflector is flat.

Each of the elongated concave reflector bodies is provided for containing one IR lamp and for reflecting the IR radiation from the IR lamp. The cross sections of the ceramic reflector represented in FIGS. 3 and 4 show the position of one IR lamp 150.

The elongated concave reflector bodies have in each cross section at both of its upstanding walls a wall height. The wall height is the vertical distance between the deepest level of the bottom section of the reflector body and the highest level of the upstanding wall. The wall height $W_e$ is at both longitudinal ends of each reflector body at both upstanding walls larger than the wall height $W_{m1}$, $W_{m2}$ in the middle section of the elongated concave reflector body. As an example $W_e$ equals 15.75 mm; whereas $W_{m1}$ equals 2.95 mm and $W_{m2}$ equals 7.25 mm. At both longitudinal ends of each reflector, the wall height is at both upstanding walls over a length L 8.5 mm larger than in the middle section of the elongated concave reflector body.

The ceramic reflector of FIGS. 1 and 2 can be manufactured as one single sintered or fused ceramic part; e.g. out of silica.

Figure 5:
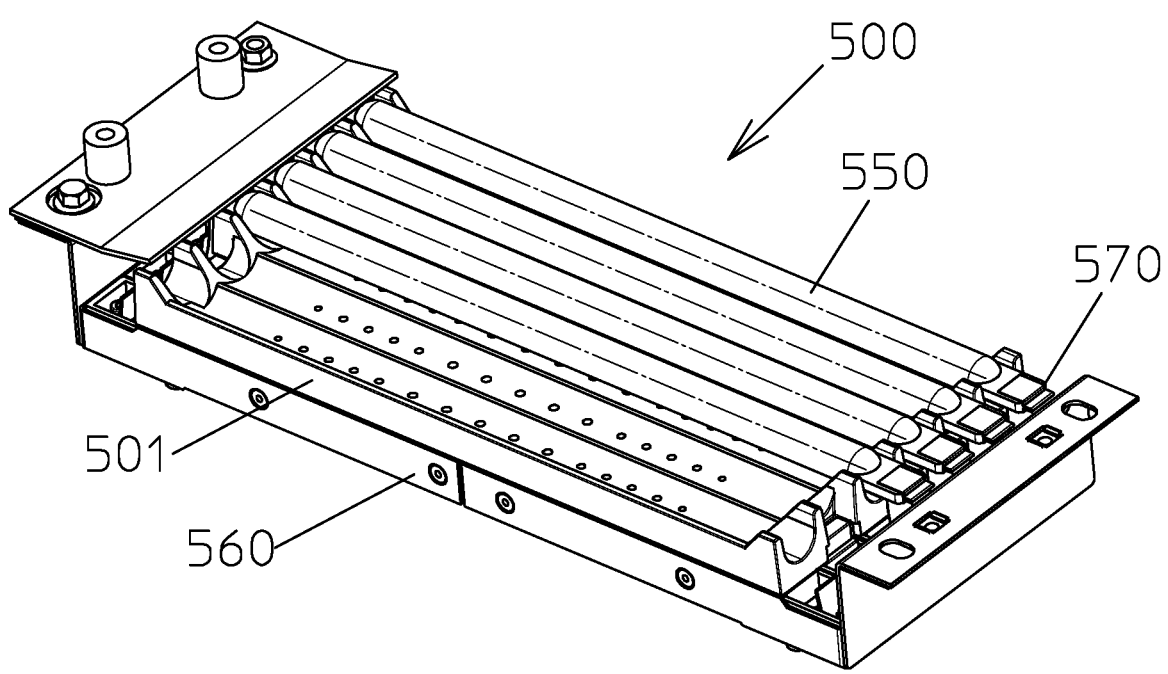
FIG. 5 shows an electrical IR emitter according to the invention.

FIG. 5 shows an electrical IR emitter 500 according to the invention. The electrical IR emitter 500 comprises a base structure 560, a ceramic reflector 501 as in FIGS. 1 and 2, IR lamps 550 and ceramic supports 570. The IR-lamps 550 are provided in elongated concave reflector bodies. The ceramic reflector 550 of FIG. 5 comprises six elongated concave reflector bodies, in four of which an IR lamp 550 is shown. The ceramic reflector 501 and the ceramic supports 570 are fixed onto the base structure 560 without direct contact between the ceramic reflector and the ceramic supports. The IR lamps 550 are electrically connected to electrical connectors in the ceramic supports 570. The electrical connectors of the IR lamps are provided outside the longitudinal ends of the reflector bodies where the wall height is at both upstanding walls larger than in the middle section of the reflector bodies. The highest level of the IR-lamps is located below the wall height of the longitudinal ends of the reflector bodies where the wall height is at both upstanding walls larger than in the middle section of the reflector bodies. The highest level of the IR-lamp is located more distant from the deepest level of the bottom section of the reflector body than the height of the upstanding walls in the middle section of the reflector bodies.

The invention claimed is:

1. A ceramic reflector for at least one IR lamp;
comprising at least one elongated concave reflector body;
wherein each of the at least one elongated concave reflector bodies comprises an elongated bottom section and two elongated upstanding walls;
wherein each of the elongated concave reflector bodies is provided for containing at least one IR lamp and for reflecting the IR light from the at least one IR lamp;
wherein each elongated concave reflector body has in each cross section at both of its upstanding walls a wall height, wherein the wall height is the vertical distance between the deepest level of the bottom section of the reflector body and the highest level of the upstanding wall;
wherein at one or at both longitudinal ends of at least one reflector body; the wall height is at both upstanding walls larger than in the middle section of the elongated concave reflector body.

2. A ceramic reflector as claimed in claim 1;
comprising a plurality of juxtaposed elongated concave reflector bodies;
wherein each of the at least one elongated concave reflector bodies comprises an elongated bottom section and two elongated upstanding walls;
wherein each of the elongated concave reflector bodies is provided for containing at least one IR lamp and for reflecting the IR light from the at least one IR lamp;
wherein each elongated concave reflector body has in each cross section at both of its upstanding walls a wall height, wherein the wall height is the vertical distance between the deepest level of the bottom section of the reflector body and the highest level of the upstanding wall;
wherein at one or at both longitudinal ends of each reflector body; the wall height is at both upstanding walls larger than in the middle section of the elongated concave reflector body.

3. The ceramic reflector as claimed in claim 1, wherein the at least one elongated concave reflector body comprises at its deepest level a number of through holes, provided for the flow of cooling air.

4. The ceramic reflector as claimed in claim 1, wherein at one or at both longitudinal ends of at least one reflector body; the wall height is at both upstanding walls over at least a length of 6 mm larger than in the middle section of the elongated concave reflector body.

5. The ceramic reflector as claimed in claim 1, wherein at one or at both longitudinal ends of at least one reflector body; the wall height is at both upstanding walls at least 7 mm; and preferably at least 10 mm, larger than in the middle section of the elongated concave reflector body.

6. The ceramic reflector as claimed in claim 2, wherein neighbouring elongated concave reflector bodies have a common elongated upstanding wall.

7. The ceramic reflector as claimed in claim 1, wherein the bottom of the ceramic reflector is flat, wherein with bottom of the reflector is meant the opposite side of the reflector from the side where the IR lamp or IR lamps can be provided.

8. The ceramic reflector as claimed in claim 1, wherein the ceramic reflector is one single sintered or fused ceramic part.

9. Electrical IR emitter, comprising
a ceramic reflector as claimed in claim 1; and
one or more than one IR lamp, wherein the IR-lamp or IR-lamps is or are provided in the elongated concave reflector bodies;
wherein the electrical connectors of the IR lamps are provided at or outside the longitudinal ends of the reflector bodies where the wall height is at both upstanding walls larger than in the middle section of the reflector bodies.

10. Electrical IR emitter as claimed in claim 9, wherein the highest level of the IR-lamp is located below the wall height of the longitudinal ends of the reflector bodies where the wall height is at both upstanding walls larger than in the middle section of the reflector bodies; wherein with the highest level of the IR-lamp is meant the level of the IR-lamp where the vertical distance from the deepest level of the bottom section of the reflector body is the highest.

11. Electrical IR emitter as claimed in claim 9, wherein the highest level of the IR-lamp is located more distant from the deepest level of the bottom section of the reflector body than the height of the upstanding walls in the middle section of the reflector bodies; wherein with the highest level of the IR-lamp is meant the level of the IR-lamp where the vertical distance from the deepest level of the bottom section of the reflector body is the highest.

12. Electrical IR emitter as claimed in claim 9;
wherein the electrical IR emitter comprises a base structure and a plurality of ceramic supports;
wherein the ceramic reflector and the plurality of ceramic supports are fixed onto the base structure without direct contact between the ceramic reflector and the ceramic supports;
wherein the electrical connectors of the IR lamps are electrically connected to electrical connectors in the ceramic supports.

* * * * *